United States Patent [19]
Kobayashi

[11] Patent Number: 5,377,312
[45] Date of Patent: Dec. 27, 1994

[54] IMAGE PROCESSING APPARATUS CAPABLE OF EXPANDING COMPRESSED DATA

[75] Inventor: Shigetada Kobayashi, Tokyo, Japan

[73] Assignee: Canon Kabushiki Kaisha, Tokyo, Japan

[21] Appl. No.: 858,409

[22] Filed: Mar. 27, 1992

[30] Foreign Application Priority Data

Mar. 29, 1991 [JP] Japan .................................. 3-65832

[51] Int. Cl.⁵ .............................................. G06F 15/62
[52] U.S. Cl. ..................................................... 395/116
[58] Field of Search ................ 395/115, 116, 164-166; 358/404, 444

[56] References Cited

U.S. PATENT DOCUMENTS

| 4,203,154 | 5/1980 | Lampson et al. | 364/200 |
| 4,679,038 | 7/1987 | Bantz et al. | 340/721 |
| 4,723,129 | 2/1988 | Endo et al. | 346/1.1 |
| 4,896,275 | 1/1990 | Jackson | 364/519 |

FOREIGN PATENT DOCUMENTS

473340  3/1992  European Pat. Off. ...... G06F 15/72

Primary Examiner—Robert L. Richardson
Attorney, Agent, or Firm—Fitzpatrick, Cella, Harper & Scinto

[57] ABSTRACT

An image processing apparatus for expanding given compressed image data in combination with other compressed image data, provided with a retaining device which retains, at the successive expansions of the compressed data, information relative to the development of a certain area until the data development of an area next to the above-mentioned certain area.

16 Claims, 8 Drawing Sheets

IMAGE PROCESSING APPARATUS CAPABLE OF EXPANDING COMPRESSED DATA

BACKGROUND OF THE INVENTION

1. Field of the Invention

The present invention relates to an image processing apparatus.

2. Related Background Art

Information constituting a page, prepared for example by a word processor or a desk-top publishing system, can be generally divided into "characters", "patterns" such as a circle or a straight line, and "images" generated for example by an image scanner. Examples of such information will be explained further with reference to FIG. 3, in which 301 indicates a one-page data prepared, for example, by a word processor or a desk-top publishing system. These "characters", "patterns" and "images" are transferred in the form of codes 302 to a next process. For encoding an "image", in the case of a multi-value color image, there is often employed an image compression method called ADCT. In the conventional method, the encoded data 302 are developed, at the image output, as a raster image in a page memory 303 representing the entire area of a page. Even in the case where two "image" codes are included as shown in 302, the use of said page memory allows, after the development of a first image by an ADCT process block, the development of a second image. Also the "character" and "pattern" are developed in this page memory. The data of one page is transmitted to a printer unit for image output.

Figure 3:
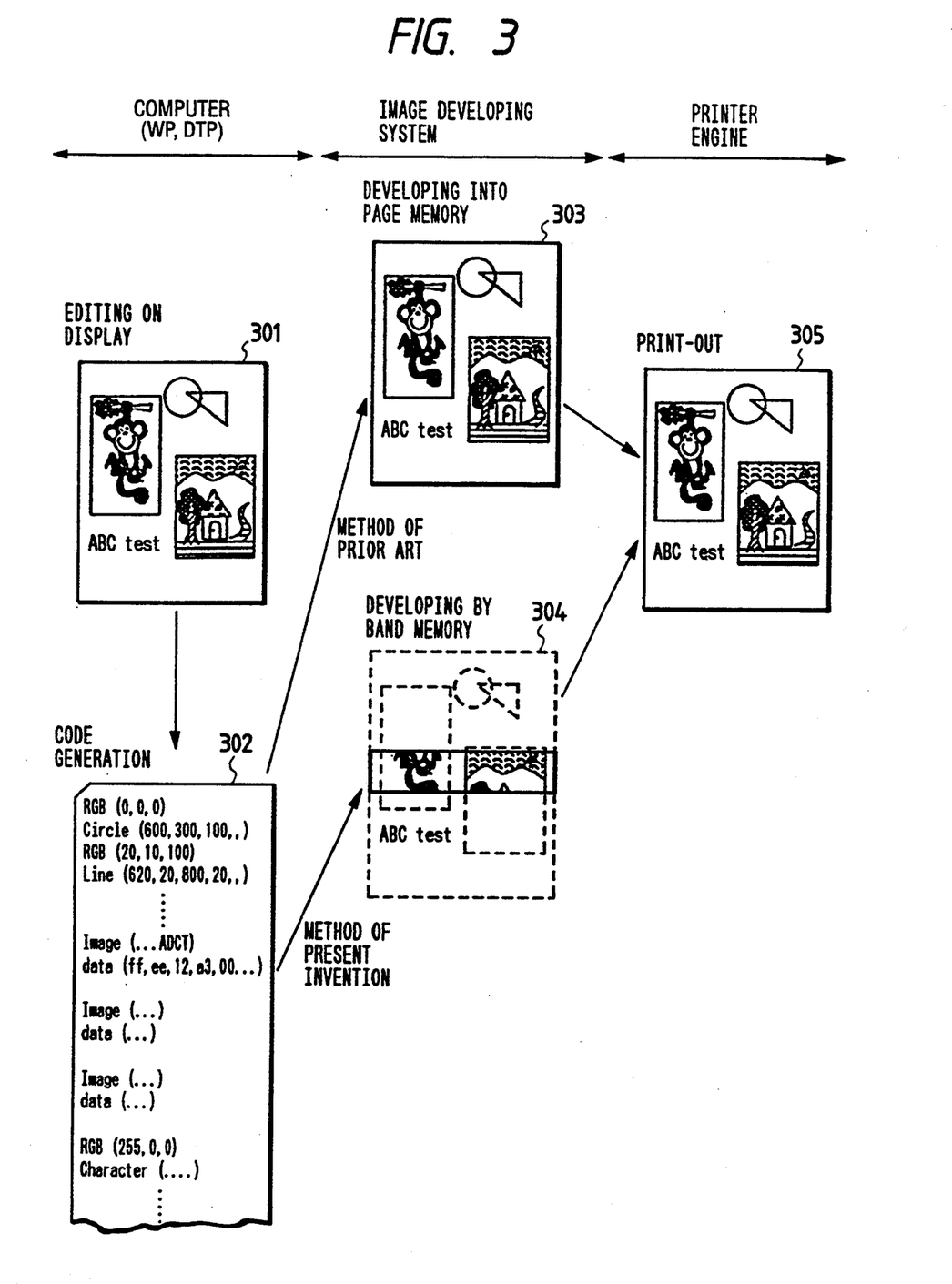
FIG. 3 is a view showing the function of said embodiment, in comparision with that of a conventional method.

However, such page memory as explained above, requires a large memory capacity. If the printer unit is of a low speed, the page memory can be composed for example of a rigid disk, but it is inevitably expensive. As an example, a printer unit employing four colors of C (cyan), M (magenta), Y (yellow) and K (black) with a resolving power of 400 DPI and a gradation of 8 bits per color, there is requires a RAM of about 60 Mbytes for an A4-sized image. For this reason there is conceived a system, as represented by 304 in FIG. 3, of dividing a page into laterally oblong segments and developing the codes in a band memory corresponding to a segment. The memory capacity can be reduced by such segmentation of a page. However, in such structure, there has not been satisfactory processing in the case where a page contains plural "images" as shown in FIG. 3. For example, referring to FIG. 4, in case an expander of compressed image expands a first image 402 in a considered segment 404, a, b, c, . . . in said image 402 signifies blocks each consisting of 8×8 pixels in the ADCT process. After successive expansions of blocks a, b, c, . . . , f, the next block expansion has to be conducted not on a block g but on a block j in a second image 404. However, satisfactory image expansion cannot be conducted because the processed image is switched from the first image to the second image.

Also the present inventor has found that a drawback is encountered if the boundary of such segment does not coincide with the boundary of a small block of the image expanded from a compressed code. In an image compression method such as ADCT, the image is processed in a block for example of 8×8 pixels. If the boundary of said block does not coincide with the boundary of segment, in a block containing the boundary of two adjacent blocks, the data processing in a portion belonging to the next block becomes a problem.

SUMMARY OF THE INVENTION

An object of the present invention is to provide an image processing method, and an apparatus therefor, capable of collectively or individually resolving such drawbacks.

Another object of the present invention is to provide an image processing method capable of satisfactorily reproducing compressed data representing plural images, and an apparatus therefor.

Still another object of the present invention is to provide an image processing method capable of satisfactorily reproducing a two-dimensionally encoded image data, and an apparatus therefor.

The above-mentioned objects can be attained, according to a preferred embodiment of the present invention, by an image processing apparatus for expanding externally given compressed data and other data in combination, comprising retaining means which, in the successive expansion of said compressed data, retains information relating to the development in a certain area, until the development in an area succeeding the certain area.

Still another object of the present invention is to provide a printer interface of a limited capacity.

Still another object of the present invention is to provide a printer interface with a novel function.

Still another object of the present invention is to provide an image processing apparatus capable of outputting of image data of high quality.

Still other objects of the present invention, and the features thereof, will become fully apparent from the following description of the preferred embodiments, to be taken in conjunction with the attached drawings.

DESCRIPTION OF THE PREFERRED EMBODIMENTS

In a preferred embodiment of the present explained in the following, there is disclosed an apparatus provided with an ADCT image compression/expansion device, means for detecting the boundary of 8×8 pixel blocks, plural Huffman tables, plural digitizing tables, plural FIFO synchroning registers, and plural DC component retaining registers and means for switching such buffers and registers for each expanded image, thereby enabling expansion of plural compressed image data contained in a segment, by means of a single expanding device. Thus, said apparatus is capable, for plural images present in a segment, of expansion of a part of the image, and a raster image can be developed from plural compressed image information, utilizing a band memory. However it is to be noted that the present invention is not limited by this embodiment.

The embodiment will be clarified in more detail in the following, with reference to the attached drawings.

FIG. 3 is a view showing the function of a system embodying the present invention, wherein 301 indicates information of a page edited in a computer such as a word processor or a desk-top publishing system. Such image information of a page is processed, inside the computer, in the formed of codes 302. The codes processed inside the computer are often different from those transmitted to the printer, but the present embodiment assumes that both code systems are same. The present invention is applicable to both cases. The codes 302 indicate the elements contained in the data 301. At first RGB (0, 0, 0) indicates that the color to be recorded is black. Then Circle (600, 300, 100) indicates the drawing of a circle. Image (. . . ADCT) data (ff, ee, . . . ) indicates the image data compressed by ADCT method. In the present embodiment, the above-explained code information is developed by an image development system 304 into a raster image, and then transferred to a printer unit for obtaining a printout 305.

Figure 1:
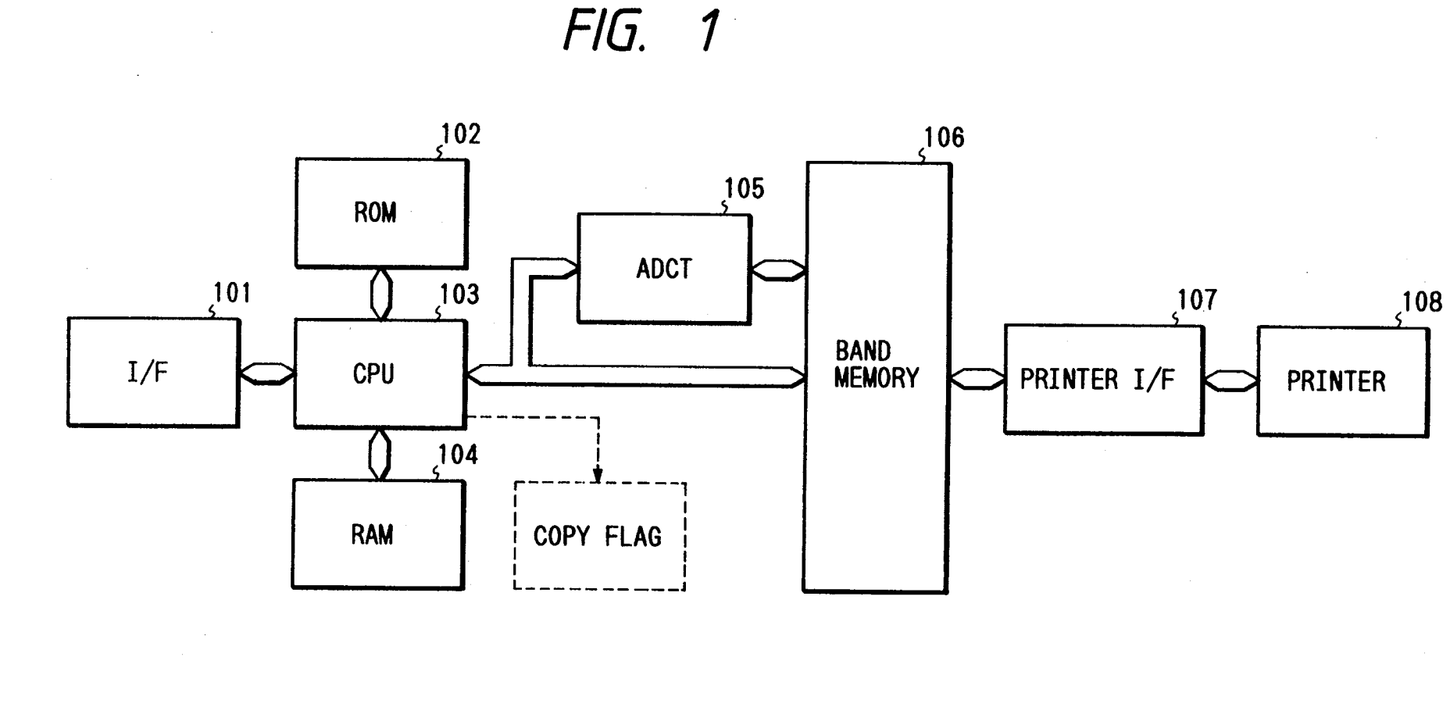
FIG. 1 is a block diagram of an embodiment of the system of the present invention.

FIG. 1 is a block diagram of a raster image developing system constituting an embodiment of the present invention, wherein an interface 101 receives code data from an external computer. The code data of a page are once stored in a RAM 104. A ROM 102 stores a program for developing the code data into a raster image, and character font data. Among the data stored in the RAM 104, the codes representing "characters" and "patterns" are developed into a raster image on a band memory 106, by means of a CPU 103, according to the program stored in the ROM 102. On the other hand, among the data stored in the RAM 104, the codes representing compressed image are converted and developed in the band memory 106 by means of an ADCT expander 105. After the image development of a segment, the raster image is transferred through an interface 107, to a printer engine 108, for effecting the image printout, and the development in a next segment is then executed. The internal structure of the ADCT process block 105 is shown in FIG. 2.

Figure 2:
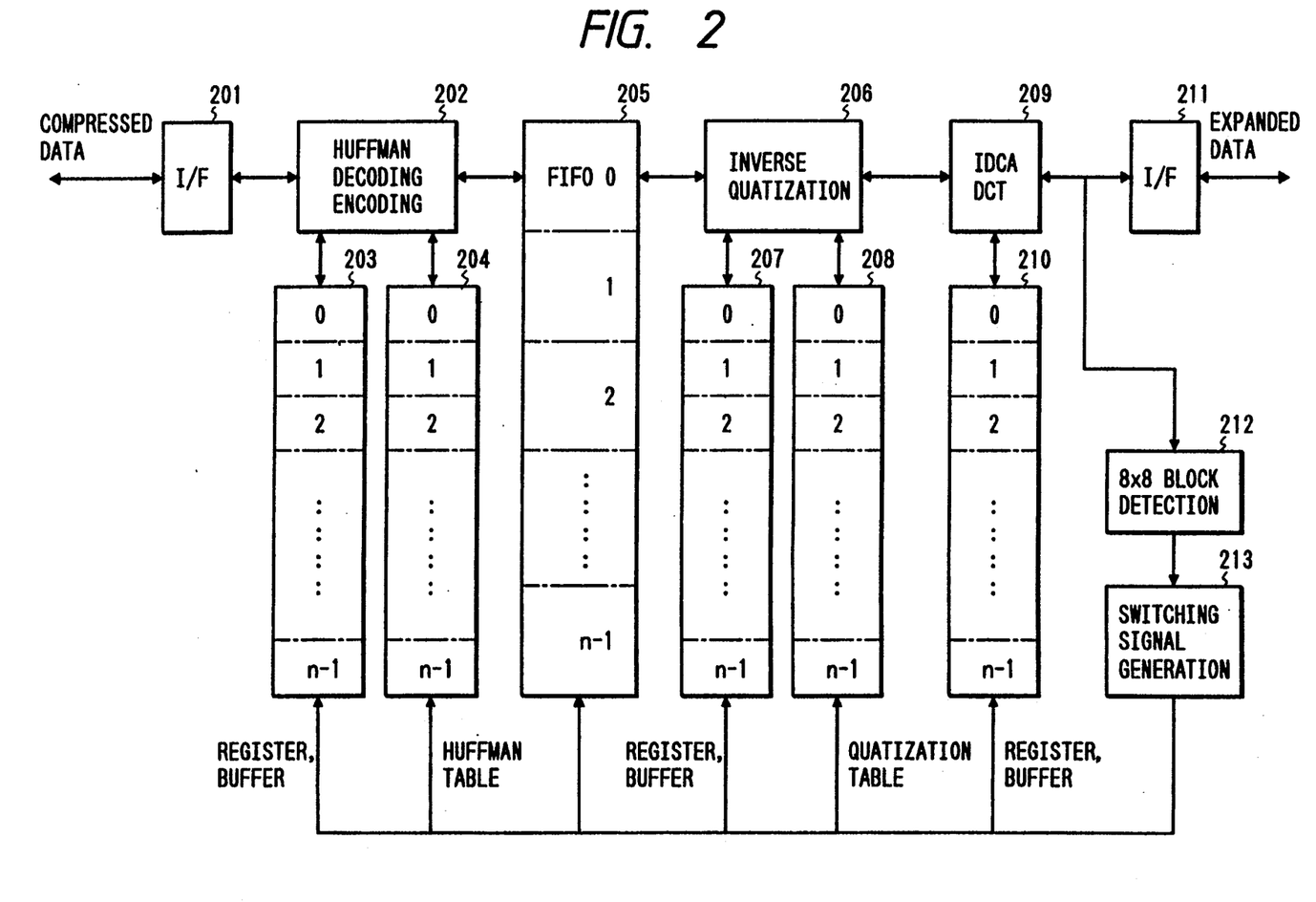
FIG. 2 is a block diagram showing the internal structure of an image expansion block.
Figure 4:
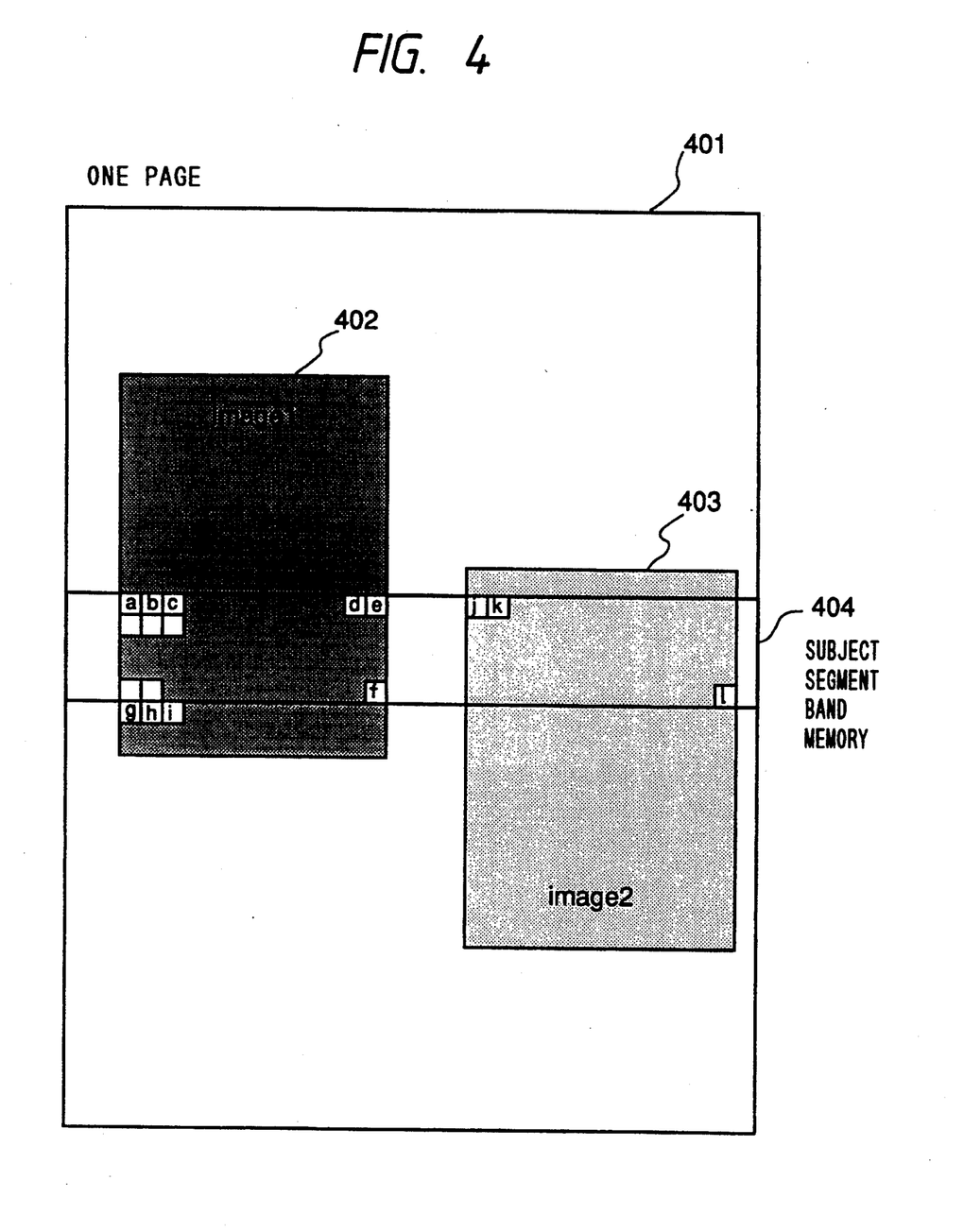
FIG. 4 is a view showing a page containing two images.

In FIG. 2 there are shown an interface 201 for data exchange with the CPU 103; a Huffman encoding/decoding block 202; a buffer and register 203 for Huffman decoding/encoding; an area 204 for storing Huffman tables for decoding; an FIFO register 205 for storing Huffman decoded data; an inverse digitizer 206 for inverse digitization of Huffman decoded data; a buffer and register 207 for said inverse digitization; an area 208 for storing digitizing tables used for said inverse digitization; a block 209 for IDCT (inverse discrete cosine transformation); a buffer and register 210 for said IDCT: an interface 211 for storing the expanded data in a band memory; an 8×8 block detector 212 for detecting the DCT block (8×8 pixels in this embodiment) and identifying the switching point between the images 1 and 2 in FIG. 4; and a switching signal generator 213 for generating a switching signal, indicating the switching from the image 1 to the image 2, based on the detected boundary of such blocks. The blocks shown in FIG. 2 are capable, not only of decoding as explained above, but also of encoding function, so that the data compression is executed by sending data from the block 211 to 201.

The printer unit employed in the present embodiment can be, for example, an ink jet printer, preferably a printer utilizing liquid droplet discharge by film boiling as disclosed in the U.S. Pat. No. 4,723,129, or an electrophotographic printer.

In case the printer employs plural recording elements arranged over a predetermined width in the sub-scanning direction and records the image of one frame by moving such plural recording elements in the main scanning direction, the width of the above-mentioned band memory is selected larger than the width of said plural recording elements.

In the following there will be explained the function of the present embodiment.

There will be considered a case in which a page contains two "images" as shown in FIG. 4. The interface 201 extracts, from the RAM 104 shown in FIG. 1, Huffman encoded data corresponding to a portion a of "image 1" (402) shown in FIG. 4, and the Huffman decoder 202 executes decoding, referring to the Huffman table 204. For decoding of the image of "image 1" (402), there is used table data #0 in the table 204. The table data are different depending on the image to be decoded, and are predetermined by the CPU. Also in the decoding there is used an area #0 of the buffer and register 203. For example in the ADCT encoding, the DC component of each block after orthogonal transformation is Huffman encoded after DPCM compression. The Huffman decoder 202 expands the DC and AC components of the original image and stores thus expanded data in an area #0 of the FIFO 205. The inverse digitizer 206 reads the data in said FIFO 205, and, after run length decoding of the AC component, applies a coefficient according to a digitizing table 208. Said table is #0 for the image 1, but may be different for the image 2, and the selection of the tables is predetermined by the CPU. Also for the work area, a portion #0 of the buffer and register 207 is used. Then the IDCT (inverse discrete cosine transformer) 209 converts the two-dimensional spatial frequency data of 8×8 pixels, obtained from the inverse digitizer, into the original image data. Also in this operation, a portion #0 of the buffer and register 210 is used. Then the interface 211 transfers the expanded data to the band memory 106. The block detector 212 detects the boundary of 8×8 block, and discriminates whether the currently expanded image reaches the boundary of a segment. After expansion of the block f in FIG. 4, the expansion operation has to proceed to a block j of the second image 403, instead of blocks g, h, i, . . . Consequently, the switching signal generator 213 counts the block boundary signal from the block detector 212 and generates a signal for switching the area from #0 to #1 in the tables and registers, at the boundary of the segment. At this moment, the Huffman decoder has already initiated the decoding of data of a next segment, but the states up to said switching are retained in the areas #0. Consequently, when the decoding of the image 2 is completed in a block, the expansion of the image 1 can be restarted, utilizing the area #0.

Subsequently, the compressed image data of the block j, k, . . . , l of the image 2 are in succession expanded and decoded.

In this operation, the data or parameters necessary in the expansion are obtained or stored in the areas #1 of the registers and tables.

After the expansion of the image 2 is executed in a subject segment 404, the segment is shifted by a band, and the expansion of the image 1 is again executed.

The data of plural compressed images can be easily expanded by the repetition of the above-explained operations.

Figure 5:
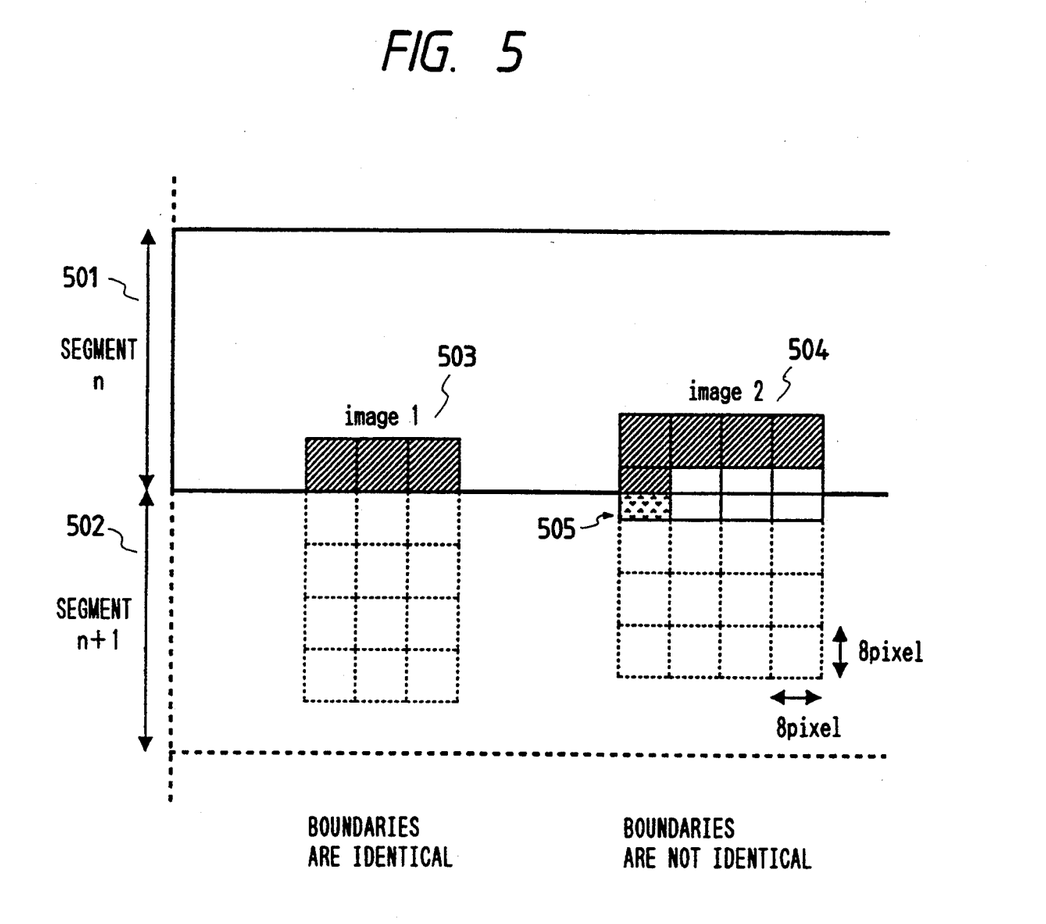
FIG. 5 is a view showing the boundaries blocks and segments.
Figure 7:
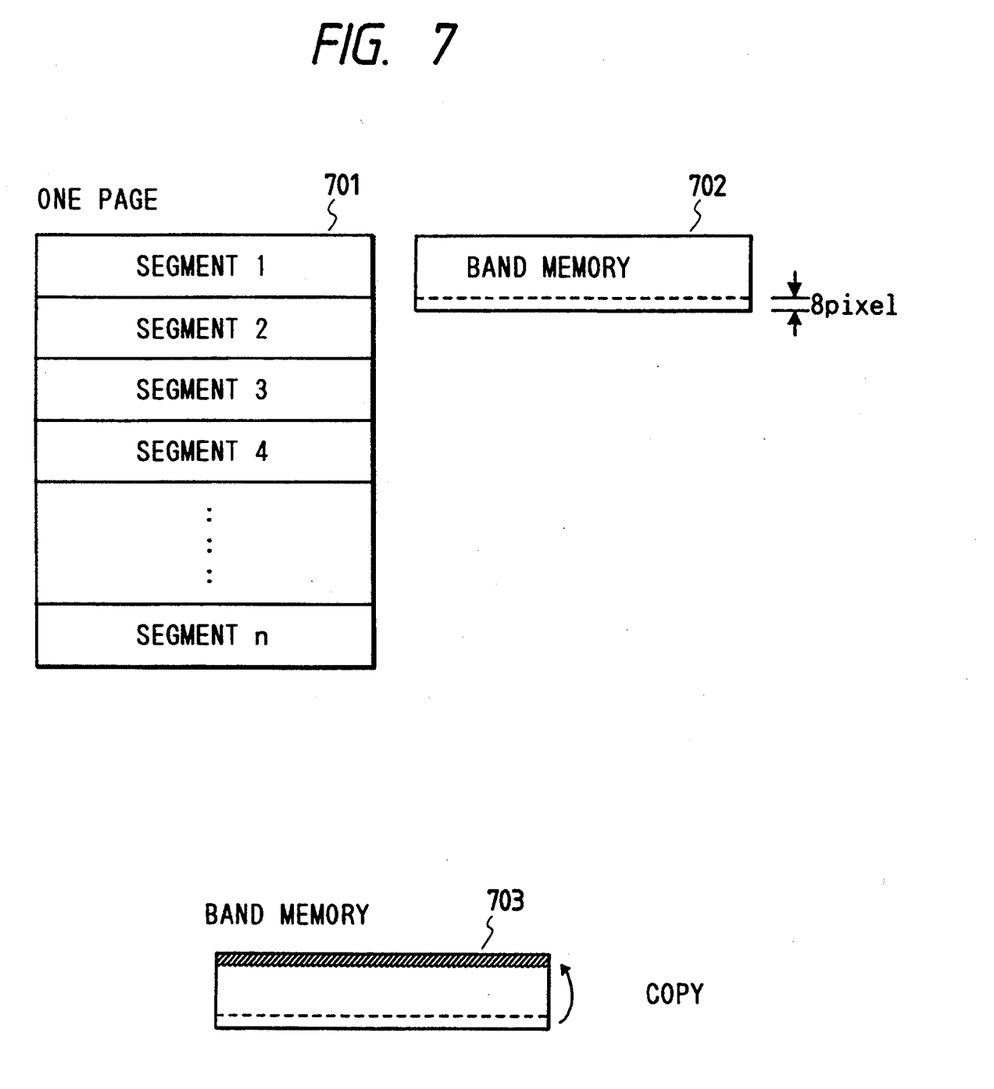
FIG. 7 is a view showing the arrangement segments and the size of a band memory.

In case the compressed image is arbitrarily positioned within a page, the boundary of 8×8 pixel block constituting the expanded image may not match the boundary of the segment. In the following there will be explained an embodiment which enables satisfactory image processing even in such case, with reference to FIG. 5. The configuration of this embodiment is same as that shown in FIG. 2. In FIG. 5, 501 indicates a segment currently subjected to data development, and 502 indicates a segment to be subjected to data development next. In an image 1 (503) the boundary of an 8×8 block coincides with the boundary of the segment, but, in another image 2 (504), the boundary of 8×8 block does not coincide with that of the segment. In the image 2, a block 505 contains portions of two adjacent segments. For retaining data not belonging to the current segment in the expansion of such block, in the present embodiment, the width of the band memory shown in FIG. 1 is selected larger, by the width of a block, than the width of a segment, and the data of a portion beyond the segment boundary are also recorded in the band memory. Then, immediately before the start of data development of a next segment, the data of said one block width are copied to the initial portion of the band memory. That data copying is not however conducted in the case of data expansion in which the boundary of 8×8 blocks coincides with that of the segment. FIG. 7 shows the sizes of the segments and the band memory. As shown in FIG. 7, the width of the band memory is selected larger, by a block or by 8 pixels, than the width of the segment. In FIG. 7, an area 703 indicates the portion of data copying mentioned above. In case the block boundary does not coincide with the segment boundary in an image, a copy flag is set whereby the data are copied to a hatched area 703 prior to the data development of a next segment.

In this manner there is provided a data expanding apparatus which enables the data expansion or a part of an image, in case plural images are present in the main scanning direction, thereby retaining the data of an interrupted expansion operation and re-starting the interrupted expansion without repeating the data expansion on same data.

In the present embodiment there are employed the register, Huffman table, buffer register and digitizing table shown in FIG. 2 corresponding to the ADCT compression method, but the configuration of the register etc. can be suitably modified according to the compression method to be employed. For example, in case of using vector digitizing compression requiring different decoding tables for different images, there may be provided a register storing such parameters corresponding to the images.

Also for the processing of a color image, there will be required the portions of the registers and tables, corresponding to the color components of such color image.

Also in the foregoing embodiment there has been explained a case in which two images are present along the main scanning direction as shown in FIG. 4, but the present invention is not limited to such case and is likewise applicable to a case in which three or more images are present along the main scanning direction.

The band memory may be constructed in so-called double buffer configuration, in order to achieve raster image development and data output to the printer unit at the same time. Also the image compression method is assumed to be the ADCT method based on the international JPEG standard, but there may be employed other encoding methods as explained above.

The above-explained embodiment allows to develop page information including plural compressed image with a band memory of a limited capacity, by an expanding apparatus provided with means for retaining the function state consisting of plural reference tables and plural buffer registers, and means detecting the boundary of pixel blocks and switching the function state for each expanded image.

In the foregoing embodiment there has been explained a case of expanding plural compressed images and developing the images in a band memory, but the present invention is not limited to such case and is likewise applicable to a case of developing data in a page memory.

As explained in the foregoing, the present invention allows satisfactory expansion of plural compressed image data with a simple configuration.

Figure 6:
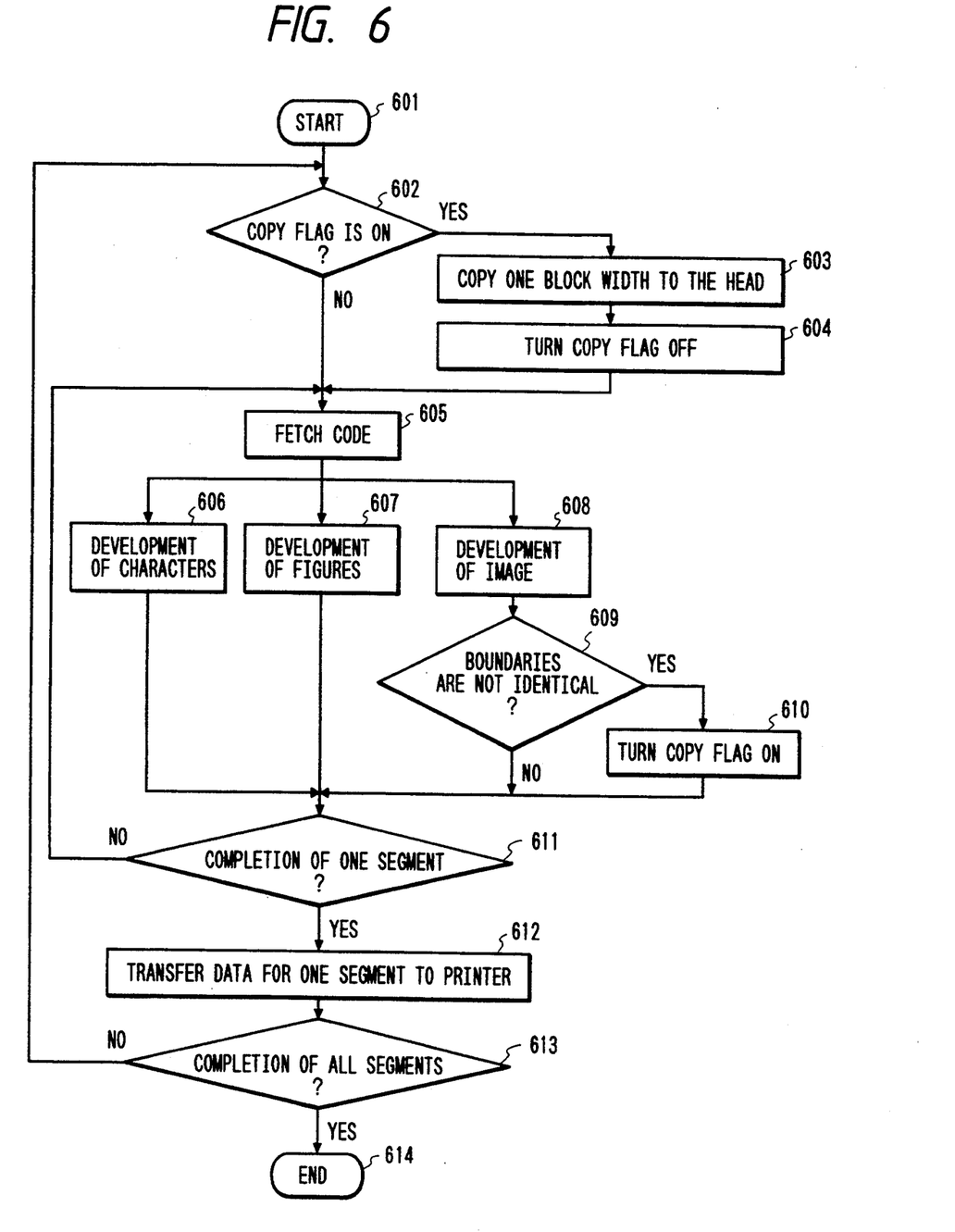
FIG. 6 is a flow chart showing the control sequence of said embodiment.

In the following the function of the above-explained embodiment will be explained further with reference to the flow chart shown in FIG. 6.

In this embodiment, as explained before, the band memory can hold, even for an image 504 shogun in FIG. 5, the data beyond the segment boundary. After the data expansion of a segment, the data of the band memory are transferred to the printer unit, and the data expansion for a next segment is initiated. In this state, the data transferred to the printer unit are those belonging to a same segment, excluding a portion of one block width. The data of said one block width are subsequently copied in a hatched area 703, at the initial portion of the band memory.

These operations will be explained with reference to the flow chart shown in FIG. 6. As explained before, it is assumed that the code data are already stored in the RAM 104 shown in FIG. 1 and are taken out therefrom for development in the band memory 106. At first a step 602 discriminates whether the data of a block width (8 pixels) are to be copied. Since the data copying is not conducted for the first segment, the sequence proceeds to a step 605 which fetches the code data. The fetched codes are subjected to development into the band memory. If the code represents "character", a step 606 effects development of a character. If the code represents "pattern", a step 607 effects development of a pattern. If the code represents "image", a step 608 effects development of an image. After the development of code as a raster image in the band memory, a step 611 discriminates whether all the codes in the current segment have been developed, and, if any code is left, the sequence returns to the step 605 for repeating the above-explained sequence. A step 609 discriminates whether the block boundary coincides with the segment boundary, and, in case of non-coincidence, a step 610 sets a copy flag. After the completion of data development of a segment, a step 612 transfers thus developed data to the printer unit. Then a step 613 discriminates whether all the segments have been processed, namely whether the development of a page has been completed. Since only the first segment has been developed in the contemplated case, the sequence returns to the step 602 for repeating the above-explained operations. In the processing of the second or subsequent segment, the copy flag may be set in the development of the preceding segment, and, in such case, the sequence from the step 602 to a step 603. The copy flag instructs processing of the overflowing portion of segment, resulting from the unmatching boundaries of block and segment (as indicated by a broken line in FIG. 1), and the data of the overflowing portion of one-block width are copied into the starting part of the band memory. Then a step 604 clears the flag, and a step 605 effects code fetching and development for the second segment. The above-mentioned operations are repeated until a step 613 identifies completion of a page. The use of the flag disperses with the copying operation of the data of one-block width in case the boundary of block matches the boundary of segment in the developed images.

In this manner there is provided a data expanding apparatus which is capable of expanding a part of the image, retaining the state of an interrupted expanding operation and re-starting such interrupted expanding operation, thereby allowing expansion of plural images arranged along the main scanning direction, without requiring repeated expansion on same compressed data.

Figure 8:
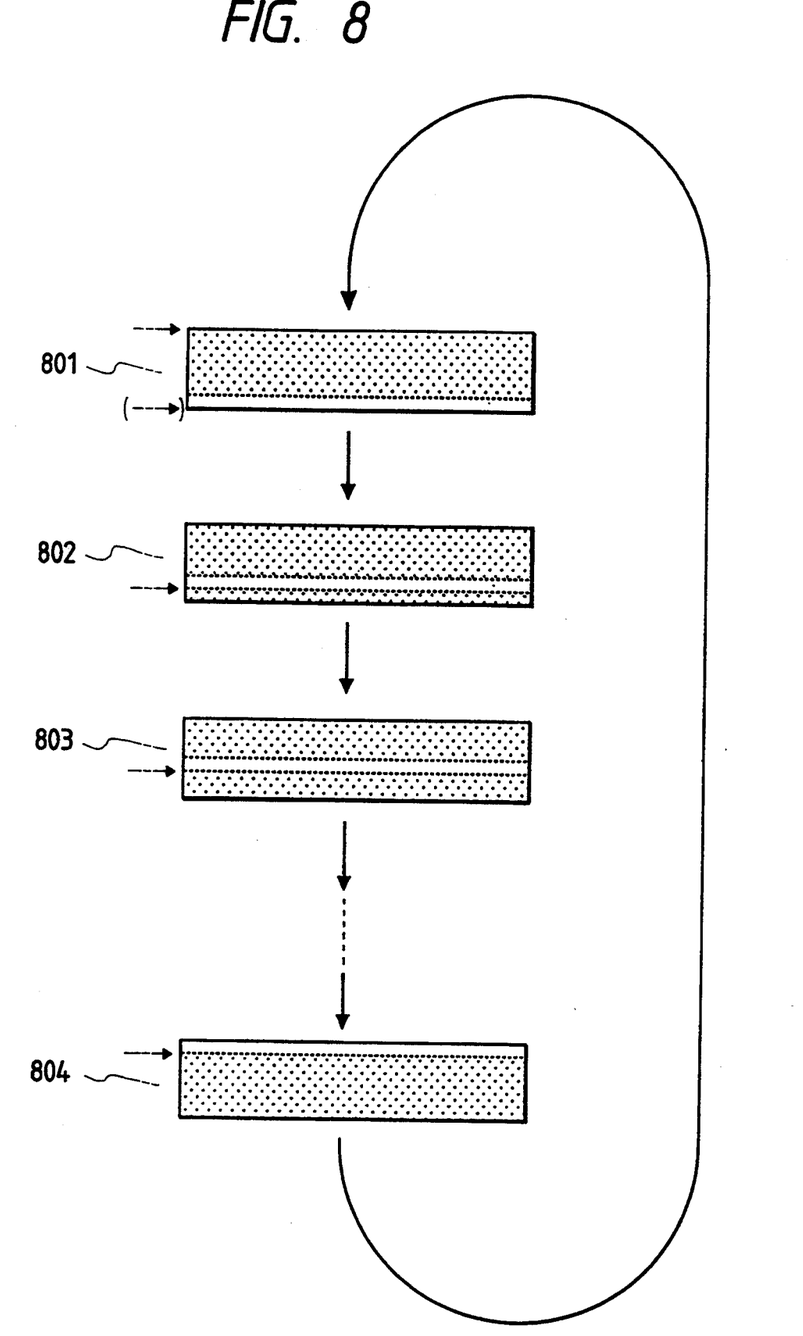
FIG. 8 is a view showing another embodiment of the present invention, in which a ring buffer employed as the band memory.

In the foregoing embodiments it is assumed that the start of the band memory 106 always coincides with the start of each segment, but there may also be employed so-called ring buffer structure. In this case said copying operation becomes unnecessary. FIG. 8 shows the modes of data development in the band memory 106 composed of such ring buffer. A dotted area indicates a memory area corresponding to the segment size, while a white area indicates a memory area of overflowing data, namely an area of one-block width. At the data development of 801, the start of the band memory coincides with the start of segment. In a second segment 802, the data development is executed with the most upper portion of one-block width of the last part, which is designated by an arrow "→", in the first segment 801 as the initial part of the second segment. The last part of the band memory in this case is constructed in the same manner as the initial part, so that a ring buffer is constituted. Though the segment 802 is illustrated in two divided parts, they can in fact be accessed in continuous manner. Also a third segment is developed with a position designated by an arrow in 803 as the initial part of the segment. After a state of 804, there is repeated the state of 801.

Such ring buffer structure enables satisfactory data expansion, even when the data overflows the segment boundary due to the unmatching boundaries of block and segment, by displacing the start position of the next segment at the data development thereof.

The present invention is not limited to the foregoing embodiments, but there may also be employed other methods as long as the unmatching boundaries of 8×8 block and segment as shown in FIG. 5 can be resolved.

What is claimed is:

1. An image processing apparatus comprising:
   decoding means for decoding an image data encoded by a two-dimensional orthogonal transform encoding method; and
   a band memory for storing image data decoded by said decoding means;
   wherein said band memory stores decoded data for a predetermined band of one frame represented by said encoded image data and a capacity of said band memory is larger than a capacity of single two-dimensional block employed in said two-dimensional orthogonal transform encoding method.

2. An image processing apparatus according to claim 1, wherein said two-dimensional orthogonal transform encoding method is ADCT.

3. An image processing apparatus according to claim 1, wherein said image data are color image data.

4. An image processing apparatus according to claim 1, further comprising:
   means for supplying image data stored in said band memory to a printer.

5. An image processing apparatus according to claim 4, wherein said printer is an ink jet printer.

6. An image processing apparatus according to claim 5, wherein said printer is adapted to deposit droplets by film boiling.

7. An image processing apparatus capable of decoding given encoded data in combination with other data, comprising:
   retaining means for retaining information relative to a development of a predetermined area, until a development of an area subsequent to said predetermined area when the encoded data is decoded sequentially.

8. An image processing apparatus according to claim 7, wherein said encoded data are encoded by ADCT method.

9. An image processing apparatus according to claim 7, wherein said predetermined area is determined according to the print band width of a printer.

10. An image processing apparatus according to claim 7, wherein said other data are also encoded by ADCT method.

11. An image processing apparatus according to claim 7, wherein said predetermined area is a predetermined band width.

12. A printer controller comprising:
    reception means for receiving, from a computer, image data encoded by a two-dimensional encoding method;
    decoding means for decoding the image data received by said reception means;
    a band memory for storing image data decoded by said decoding means,
    wherein said band memory stores decoded data for a predetermined band of one frame represented by said encoded image data and a capacity of said band memory is larger than a capacity of single two-dimensional block employed in said two-dimensional orthogonal transform encoding method; and
    output means for outputting the image data, stored in said band memory, to a printer.

13. An image processing apparatus according to claim 12, wherein said two-dimensional orthogonal transform encoding method is ADCT.

14. An image processing apparatus according to claim 12, wherein said image data are color image data.

15. An image processing apparatus according to claim 12, wherein said printer is an ink jet printer.

16. An image processing apparatus according to claim 15, wherein said printer is adapted to deposit droplets by film boiling.

* * * * *

UNITED STATES PATENT AND TRADEMARK OFFICE
CERTIFICATE OF CORRECTION

PATENT NO. : 5,377,312

DATED : December 27, 1994

INVENTOR : SHIGETADA KOBAYASHI

It is certified that error appears in the above-identified patent and that said Letters Patent is hereby corrected as shown below:

<u>IN THE DRAWINGS</u>

<u>Sheet 2 of 8</u>

FIG. 2, "QUATIZATION" (both occurrences) should read --QUANTIZATION--.

<u>COLUMN 1</u>

Line 41, "there is requires" should read --requires--.

<u>COLUMN 2</u>

Line 48, "boundaries" should read --boundaries of--.
Line 52, "arrangement" should read --arrangement of--.
Line 55, "buffer" should read --buffer is--.

<u>COLUMN 3</u>

Line 68, "capable," should read --capable--.

<u>COLUMN 6</u>

Line 11, "to develop" should read --the development of--.
Line 12, "image" should read --images--.
Line 32, "shogun" should read --shown--.

UNITED STATES PATENT AND TRADEMARK OFFICE
CERTIFICATE OF CORRECTION

PATENT NO. : 5,377,312

DATED : December 27, 1994

INVENTOR : SHIGETADA KOBAYASHI

It is certified that error appears in the above-identified patent and that said Letters Patent is hereby corrected as shown below:

COLUMN 8

Line 4, "a capacity of single" should read --a capacity of a single--.
Line 52, "a capacity of single" should read --a capacity of a single--.

Signed and Sealed this

Twenty-third Day of May, 1995

Attest:

BRUCE LEHMAN

Attesting Officer   Commissioner of Patents and Trademarks